United States Patent [19]

Hashimoto et al.

[11] 4,435,704

[45] Mar. 6, 1984

[54] LOOP TRANSMISSION SYSTEM

[75] Inventors: Toyokazu Hashimoto, Kanagawa; Hiroyuki Wada, Hadano; Masahiko Kida, Hadano; Hisashi Matsumura, Hadano; Susumu Nakayashiki, Yokohama, all of Japan

[73] Assignee: Hitachi, Ltd., Tokyo, Japan

[21] Appl. No.: 354,918

[22] Filed: Mar. 8, 1982

[30] Foreign Application Priority Data

Mar. 13, 1981 [JP] Japan .................................. 56/35337
Sep. 7, 1981 [JP] Japan ................................ 56/139715

[51] Int. Cl.³ ......................... H04Q 9/00; G06F 11/00
[52] U.S. Cl. ........................... 340/825.01; 340/825.05; 370/15; 371/22
[58] Field of Search ...................... 340/825.01, 825.05; 371/22, 8, 24, 34; 370/15; 179/175.31 R

[56] References Cited

U.S. PATENT DOCUMENTS

| | | | |
|---|---|---|---|
| 4,159,470 | 6/1979 | Strojny et al. | 340/825.01 |
| 4,271,511 | 6/1981 | Manber et al. | 340/825.01 |
| 4,271,513 | 6/1981 | Maejima et al. | 371/22 |
| 4,317,010 | 2/1982 | Fillot | 179/175.31 R |
| 4,320,508 | 3/1982 | Takezoe | 371/22 |
| 4,352,103 | 9/1982 | Slater | 340/825.01 |

*Primary Examiner*—Donald J. Yusko
*Attorney, Agent, or Firm*—Antonelli, Terry & Wands

[57] ABSTRACT

A loop transmission system including a plurality of stations connected in series in a looped transmission line to transfer data among the stations, wherein the stations include a supervising station and at least one terminal station and the transmission line is duplicated so that when a fault occurs in currently used one of the transmission lines, the other transmission line which has been used as a spare is used for transmission of data, while the supervising station sends out a specific signal to the spare transmission line and the terminal stations each determines one of the transmission lines through which the specific signal is detected, as the spare.

14 Claims, 3 Drawing Figures

LOOP TRANSMISSION SYSTEM

BACKGROUND OF THE INVENTION

1. Field of the Invention

The present invention relates to a loop transmission system, also called a data highway, having a plurality of stations or node processors connected in series on a looped transmission line to transfer data among the stations, in which an additional looped transmission line is provided so that one of the loop transmission lines is selectively used as an active line while the other line operates as a spare on which no data transmission occurs, and when a fault occurs in the active one of the transmission lines used for data transmission (hereinafter referred to as a current or active transmission line), the other transmission line (hereinafter referred to as a spare transmission line) is used for data transmission.

2. Description of the Prior Art

In the loop transmission system, it has been a common practice to duplicate the loop transmission line to enhance the reliability of the looped transmission path. In order to discriminate the current transmission line from the spare transmission line or switch the transmission line from the current one to the spare one, it has been proposed that a control signal line be provided in addition to the two data transmission lines to monitor the loop transmission system and control the switching of the system. In this arrangement, a control station sends a current/spare discrimination signal or a switching signal to the respective stations through the control signal line to discriminate the spare transmission line or switch the transmission line. However, since the arrangement requires the additional control signal line and a separate control circuit associated with that control signal line, the cost of the system is undesirably expensive.

When a fault has occurred in the current or active transmission line and the loop has been switched to the spare transmission line, a search for the fault location of the fault in the former current transmission line which is now the spare transmission line has been conducted, in the past, after the completion of the transmission operation, or by investigating connection units one by one, between every two terminal stations or between a supervising station and the terminal station, or by providing in each of the terminal or supervising stations at the side to be connected to the spare transmission line a circuit having the same or equivalent function as that of a circuit connected to the current transmission line to investigate the status of the line under the control of a test program.

However, all of the above methods provide a problem in that the first method of investigation after the completion of the transmission operation is not applicable to a stop-free operation system and the second method of investigation of the respective connection units needs much manpower and a long time, while the third method needs substantial hardware and is not economical.

SUMMARY OF THE INVENTION

It is a first object of the present invention to provide a loop transmission system which eliminates the drawbacks of the prior art system, that is, which does not need a separate transmission line for discriminating the current/spare operating status of the transmission lines and for switching the transmission lines.

A further object of the present invention is to provide a loop transmission system which can readily and economically locate a fault without stopping the system operation after the loop has been switched.

In accordance with the present invention, in a loop transmission system having a plurality of stations connected in series by a pair of looped transmission lines, one station, called a supervising station, sends a specific signal having, for example, a repetitive pattern of "1" and "0" to the spare transmission line. The other stations, called terminal stations, can detect the specific signal through either one of the pair of transmission lines. The transmission line from which the specific signal is detected is determined as the spare transmission line and the transmission line from which the specific signal is not detected is determined as the current transmission line.

DETAILED DESCRIPTION OF THE PREFERRED EMBODIMENTS

Figure 1:
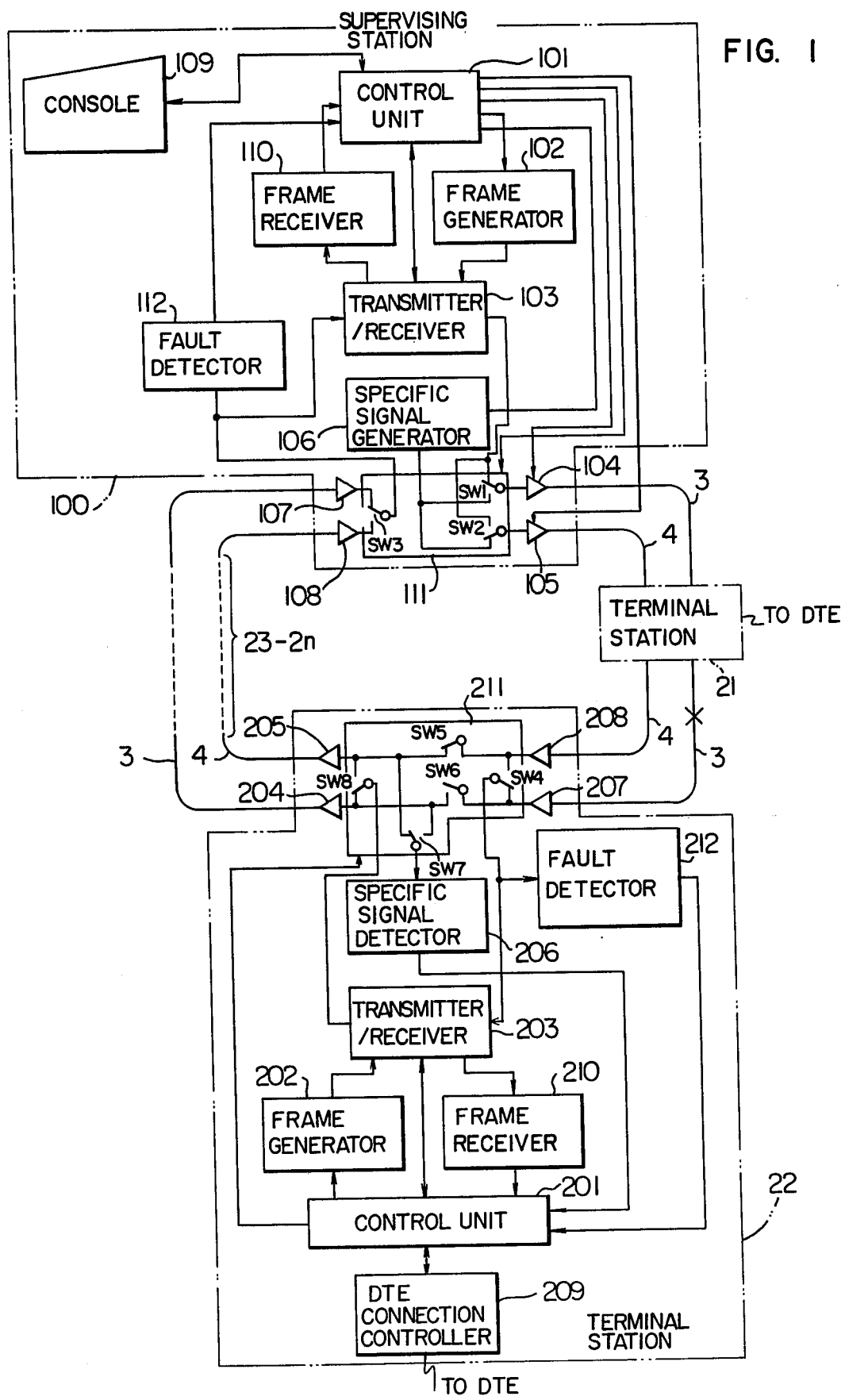
FIG. 1 shows a schematic block diagram of one embodiment of a loop transmission system of the present invention.

FIG. 1 shows a schematic block diagram of one embodiment of a loop transmission system of the present invention.

A supervising station 100 for controlling the operation of the entire loop transmission system and a plurality of terminal stations 21–2n are connected in series via looped transmission lines 3 and 4. Signals on the transmission lines 3 and 4 are transmitted clockwise as viewed in the figure. Numeral 101 denotes a control unit in the supervising station 100 the operation of which is controlled by a microprogram, and numeral 102 denotes a frame generating circuit for generating a transmission frame of data to be sent out to the current transmission line. The frame generating circuit 102 also generates a frame message to be sent out to the transmission line for inquiring to the terminal stations 21–2n as to the status of the spare transmission line. Numeral 103 dentoes a transmitter/receiver circuit which receives the transmission frame from the frame generating circuit 102 in bit parallel form, converts it to a bit-serial data format and sends it out to a modulation circuit 104 or 105. The modulation circuits 104 and 105 each modulates a carrier wave with the input data and sends it out to the transmission line 3 or 4. The operations of the respective units are controlled by the control unit 101.

Connected to the input terminals of the modulation circuits 104 and 105 are switches SW1 and SW2, respectively. The switches SW1 and SW2 each supplies an output of a specific signal generating circuit 106 which generates a repetitive pattern of "1010–", that is, a dot pattern of data, to the modulation circuit 104 or 105, or supplies the output of the transmitter/receiver circuit 103 to the modulation circuit 104 or 105. That is, the switches SW1 and SW2 are operative for switching the loops. The transmission lines 3 and 4 are connected so that, when one of the transmission lines 3 and 4 is connected to the transmission/receiver circuit 103, the other is connected to the specific signal generating circuit 106, and the transmission line connected to the transmitter/receiver circuit 103 is acting as the current or active transmission line.

The transmission frame from the transmission line 3 or 4 is demodulated by a demodulation circuit 107 or 108, an output of which is supplied to the transmitter/receiver circuit 103 through a selection switch SW3 which now selects the current or active transmission line.

Only one transmission right serving information so-called as "token pattern" is circulating over the current or active transmission line. When the supervising station 100 is ready to transmit the transmission frame, it is allowed to transmit the transmission frame, by receiving the token pattern through the transmitter/receiver circuit 103. The bit-serial data from the demodulation circuit 107 or 108 is converted to a bit-parallel data format by the transmitter/receiver circuit 103, and if it is a transmission frame addressed to its own station, it is transferred to a frame reception circuit 110. The control unit 101 checks the content of the transmission frame to display the content on a console 109 or carry out necessary process on it.

The transmission frame supplied to the transmitter/receiver circuit 103 from the current or active transmission line is again returned to that same transmission line through the switch SW1 or SW2, irrespective of whether it is addressed to the supervising station 100 or not. The switches SW1 and SW2 are arranged in a switching circuit 111 and the operations thereof are controlled by signals from the control unit 101. Numeral 112 denotes a fault detection circuit which checks the normality of a timing signal synchronized with the data sampled by the demodulation circuit 107 or 108 associated with the current transmission line and, if an abnormality is detected, produces a fault detection signal and supplies it to the control unit 101.

The terminal stations 21-2n are constructed in the same manner as typically shown in the terminal station 22. In the terminal station 22, a control unit 201 controls the overall operation of the terminal station 22 by a microprogram, in the same manner as the control unit 101 of the supervising station 100. The terminal station 22 operates under the control of the control unit 201.

The data from the transmission lines 3 and 4 are demodulated by demodulation circuits 207 and 208, respectively. The demodulation circuits 207 and 208 are of the same construction as the demodulation circuits 107 and 108. The data demodulated by the demodulation circuit 207 or 208 is supplied to a transmitter/receiver circuit 203 through a selection switch SW4 which is positioned to select the current transmission line.

A transmitter/receiver circuit 203 converts the input transmission frame from the bit-serial data format to a bit-parallel data format, and if it is a transmission frame addressed to its own station, it is transferred to a frame receiver circuit 210. The control unit 201 checks the content of the transmission frame and if it is data to be processed by a data terminal equipment (DTE) connected to its own station, it is supplied to the DTE through a DTE connection control circuit 209.

An inquiry frame reception circuit 210 analyzes the received inquiry frame and transmits the content to the control unit 201.

A specific signal detection circuit 206 is connected to the transmission line 3 or 4, whichever is acting as the spare, by a selection switch 7. When the dot pattern is received for a time longer than a predetermined period of time from the transmission line to which the circuit 206 is connected, the circuit 206 produces an output signal of "ON" which is supplied to the control unit 201.

When the inquiry frame reception circuit 210 receives the inquiry frame from the supervising station 100, the control unit 201 examines the signal from the specific signal detection circuit 206 and it causes a frame generation circuit to generate a response frame indicating whether the dot pattern is being received or not, depending on the result of the examination. The transmitter/receiver circuit 203 receives the transmission frame from the frame generating circuit 202 in bit parallel form, converts it to a bit-serial data format and sends it out to a modulation circuit 204 or 205 through a selection switch SW8.

As described above, only one transmission right serving information or token pattern is circulating over the current transmission line. When the terminal station 22 is ready for transmitting a transmission frame, it is allowed to transmit the frame by receiving the token pattern through the transmitter/receiver circuit 203.

Modulation circuits 204 and 205 modulate carrier waves with the input data and send them out to the transmission lines 3 and 4. The selection switch SW8 is positioned to select the modulation circuit connected to the current transmission line. The transmission frame supplied from the current transmission line to the transmitter/receiver circuit 203 is again returned to the current transmission line through the switch SW8 irrespective of whether the transmission frame is addressed to the sending station.

A switch SW5 is located between the demodulation circuit 208 and the modulation circuit 205 and a switch SW6 is located between the demodulation circuit 207 and the modulation circuit 204. One of the switches SW5 and SW6 which is connected to the spare transmission line is closed while the other one connected to the current or active transmission line is opened.

The switches SW5-SW8 arranged in a switching circuit 211 are controlled for their positions by signals from the control unit 201.

Numeral 212 denotes a fault detection circuit which is identical to the fault detection circuit 112. It checks the normality of a timing signal synchronized with the data sampled by the demodulation circuit 207 or 208, whichever is connected to the current transmission line, and if an abnormality is detected, it produces a fault detection signal and supplies it to the control unit 201.

Figure 2:
FIG. 2 shows a format of a transmission frame sent out to the current transmission line.

FIG. 2 shows a format of the transmission frame sent out to the current transmission line by the transmitter/receiver circuit 103 or 203. It is similar to the format of the well-known HDLC (high level data link control procedures) transmission frame. It comprises a one-byte flag ($F_1$) for indicating the beginning of the frame, a one-byte field (DA) for specifying an address of a station which is to receive the particular frame, a one-byte field (SA) for specifying an address of a station which transmits the particular frame, a one-byte sequence field (C) for indicating a serial number of data, a data field (DATA) for indicating the transfer information, a two-byte field (CRC) for adding a CRC code necessary for CRC check to detect an error such as a bit error in the contents in the DA to DATA fields, a one-byte loop answer field (LA) for sending back a response from the receiving station R-ST, and a one-byte flag ($F_2$) for indicating the end of the frame. The length of the DATA field may be variable depending on the contents of the information to be transmitted. The flags $F_1$ and $F_2$ have the same pattern.

The transmitter/receiver circuits 103 and 203 each examines the DA field of the transmission frame to check if the data is addressed to its own station, and the control units 101 and 201 each examines specific bits in the DATA field thereof to determine if it is an inquiry frame or a response frame or a frame including the data to be processed by the DTE.

The operation of the present system is now explained.

It is assumed that one of the terminal stations 21-2n which has been deactivated is now to be activated by establishing a logical connection to the transmission line.

This sequence is carried out, for example, when the terminal station is to return to its normal operation after completion of a maintenance operation or when the terminal station starts its operation later than other terminal stations.

When a start command is supplied to the control unit 201, the control unit 201 refers to the output signal of the specific signal detection circuit 206 to determine which one of the transmission line A (3) and the transmission line B (4) is acting as the current or active transmission line. The signal from the spare transmission line should indicate the dot pattern. Thus, the transmission line from which no dot pattern is received is determined as the one acting as the current transmission line and the control circuit 201 controls the switching circuit 211 to make suitable connections depending on the determination of the current transmission line thereby to establish the communication between the current transmission line and the transmitter/receiver circuit 203. In this manner, the current transmission line is selected.

The switching operation of the transmission line acting as the current transmission line to be acting as the spare transmission line, upon occurrence of a fault is now explained.

It is assumed that the switches $SW_1$ and $SW_8$ are connected as shown in FIG. 1 and the fault has occurred at a location marked X between the terminal stations 21 and 22 when the transmission line A (3) is acting as the current or active transmission line.

The terminal station 22 detects the abnormality in the timing signal in the transmission line A (3) by the fault detection circuit 212. If the terminal station 22 is transmitting or receiving data, the transmission or reception of the data is stopped. Since the dot pattern data is continuously sent out to the transmission line B (4) which is acting as the spare transmission line, the transmission line B (4) still remains as the spare transmission line and the transmission line is not yet switched. Accordingly, the terminal station 22 sends the signals on the transmission line A (3) and the transmission line B (4) to the terminal station 23. The terminals 23-2n carry out the same operations.

The supervising station 100 detects the fault by the fault detection circuit 112, in the same manner as the terminal stations 22-2n. Then, the control unit 101 of the supervising station 100 instructs the modulation circuit 104 to stop sending out the modulation signal to the transmission circuit A (3), and instructs the switching circuit 111 to disconnect the switch $SW_2$ from the specific signal generating circuit 106 for stopping the sending out of the dot pattern data to the transmission line B (4). As a result, the control circuit 201 in each of the terminal stations 21-2n detects, through the specific signal detection circuits 206 that the dot pattern data is no longer present thereby determining that a looped transmission line switching command has been transmitted from the supervising station 100 and instructs the switching circuit 211 to select the transmission line B (4) as the current or active transmission line. In this manner, the looped transmission line is switched. Thereafter, the transmission/reception of the transmission frame between the supervising station 100 and the terminal station or between the terminal stations is permitted.

Before the frame transmission/reception is restarted or in parallel with the operation of frame transmission/reception after restart, a fault locating operation is carried out in the following manner. The fault locating operation may be automatically started in response to the switching of the looped transmission line, or it may be instructed by an operator through the console 109 of the supervising station 100. In any case, the control unit 101 instructs the switching circuit 111 to connect the switch $SW_1$ to the specific signal generating circuit 106 for sending out the dot pattern data to the transmission line A (3). It also causes the frame generating circuit 102 to transmit the inquiry frame to the terminal station 21. The inquiry frame is used to check if the dot pattern data is received from the transmission line A (3) which is now acting as the spare transmission line, and it is sent out to the transmission line B (4) through the transmitter/receiver circuit 103 and the modulation circuit 105.

When the terminal station 21 receives the inquiry frame, the control unit 201 of the terminal station 21 detects the reception of the inquiry frame through the data transmitter/receiver circuit 203 and the frame reception circuit 210. When the inquiry frame is detected, the control unit 201 checks the output signal of the specific signal detecting circuit 206. In the illustrated example, since no fault has occurred between the terminal station 21 and the supervising station 100, the specific signal detection circuit 206 receives the dot pattern data. Accordingly, the terminal station 21 causes the frame generation circuit 202 to generate a response frame indicating "Dot pattern data being received" which is sent to the supervising station 100, through the transmitter/receiver circuit 203, the modulation circuit 205 and the transmission line B (4) now acting as the current transmission line. In the supervising station 100, the response frame is applied to the control unit 101 through the demodulation circuit 108, the transmitter/receiver circuit 103 and the frame reception circuit 110. When it is received, the control unit 101 detects that the terminal station 21 is normally receiving the dot pattern, and then inquires to the terminal station 22 if it is receiving the dot pattern data, in the same manner as described above. Since the fault location is upstream the terminal station 22, the terminal station 22 sends back to the supervising station 100 a response frame indicating "Dot pattern data not received". In this manner, the inquiries are sequentially given to the terminal stations 21 to 2n and the results of the inquiries are supplied to the console 110 by the control unit 101 of the supervising station 100 to inform them to an operator. The operator then knows which terminal stations have detected or have not detected the dot pattern data thereby to determine a particular section in the transmission line A (3) where the fault has occurred.

Figure 3:
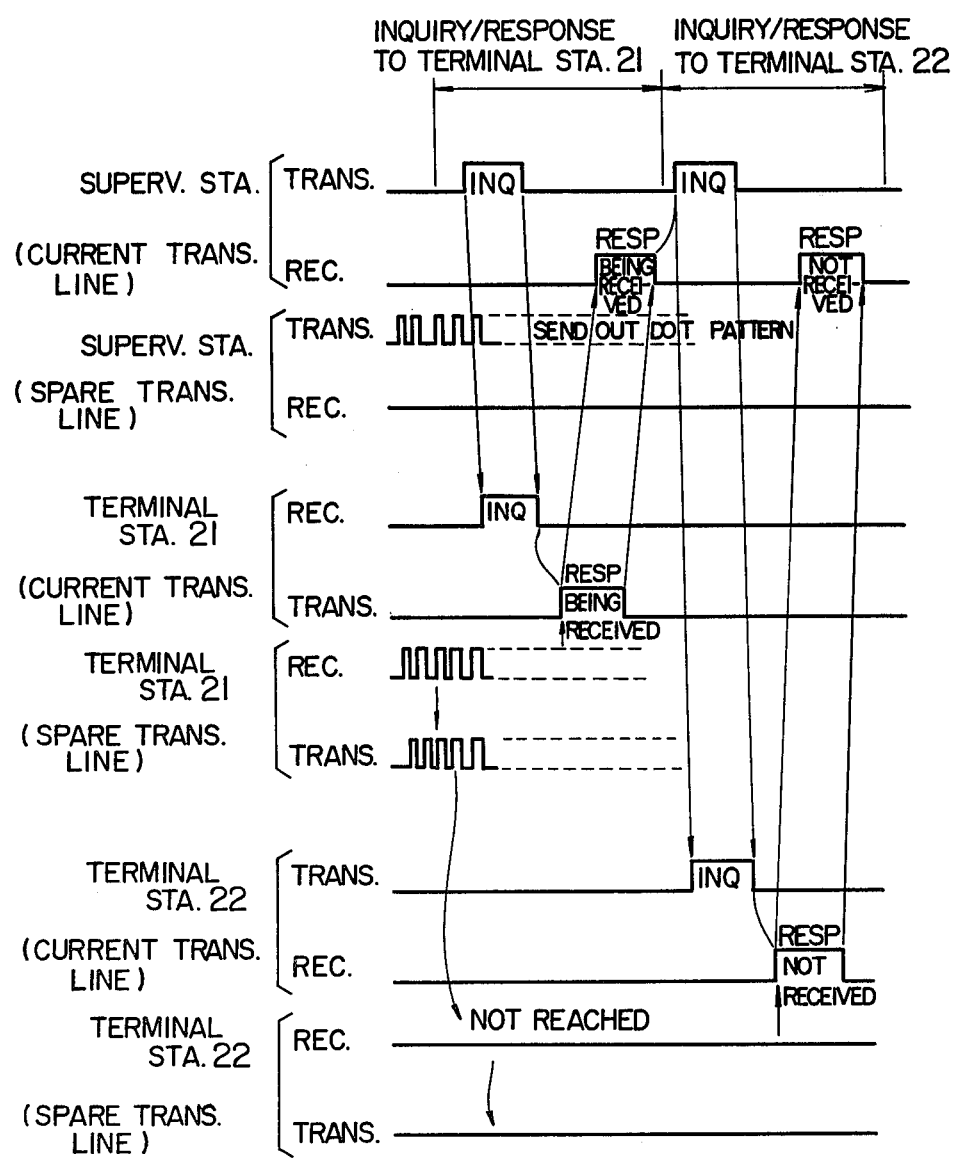
FIG. 3 shows a time chart for explaining a fault location operation in the loop transmission system shown in FIG. 1.

FIG. 3 shows a time chart for the above operation. In FIG. 3, the inquiry and the response frames relating to the fault location are shown but those relating to the ordinary data transmission are omitted. The inquiry and response frames for the terminal stations 23-2n are also omitted.

In the illustrated embodiment, the dot pattern of a very simple form is used as the specific signal to be sent out to the spare transmission line. Other signals such as "11001100..." may be used so long as they are distinctive from non-transmission condition such as all- "0's" or all- "1's".

The configuration shown in FIG. 1 is a mere embodiment, and the consolidation of the circuits such as the frame generating circuit 102 and the electronization of the switches may be readily effected. It should be understood that the present invention covers all of those modifications.

In the illustrated embodiment, the fault detection circuits 112 and 212 detect the fault by the timing signal synchronized with the data. Alternatively, the fault may be detected by the validity check of the data or the sequence check of the data. Thus it should be understood that the fault detection method should not be limited to a particular one.

While one supervising station is shown in the embodiment, the supervising station may be connected to a site of an appropriate terminal station or the function of the supervising station may be added to the terminal station.

While n terminal stations have been shown, only one terminal station may be connected.

The present invention thus offers the following advantages.

(1) Since the control is conducted through the data transmission line, no additional control line is needed.

(2) Since the communication for the inquiry of the fault detection and the response thereto is conducted through the current transmission line during the ordinary data transmission, the fault can be located during the on-line operation. Thus, the stop-free loop transmission system is provided.

(3) Since the response is sent back to the inquiry from the supervising station, the remote diagnosis by the supervising station is attained and hence manpower is saved.

We claim:

1. A loop transmission system including a plurality of stations connected in series in a pair of looped transmission lines, wherein said plurality of stations include a supervising station and at least one terminal station,
   said supervising station comprising specific signal sending means for sending out a specific signal selected one of said pair of transmission lines which is to be operated as a spare line not used for data transmission, and
   said terminal station comprising specific signal detection means capable of detecting said specific signal from said specific signal sending means through either one of said pair of transmission lines, and discrimination means for controlling the transmission line through which said specific signal is detected by said detection means to operate as a spare transmission line which is not used for data transmission and for controlling the transmission line through which said specific signal is not detected to operate as a currently used transmission line for data transmission.

2. A loop transmission system according to claim 1 wherein said plurality of stations include a plurality of such terminal stations.

3. A loop transmission system according to claim 1 or 2 wherein said specific signal sending means generates a data signal of a repetitive pattern of "1" and "0".

4. A loop transmission system including a plurality of stations connected in series in a pair of looped transmission lines, wherein said plurality of stations include a supervising station and at least one terminal station,
   said supervising station comprising specific signal sending means for sending out a specific signal to a selected one of said pair of transmission lines which is to be operated as a spare line not used for data transmission and specific data sending means for sending out a specific data message to a currently used one of said pair of transmission lines; and
   said terminal station comprising specific signal detection means capable of detecting said specific signal through either one of said pair of transmission lines, discriminating means for controlling the transmission line through which said specific signal is detected by said specific signal detection means to operate as a spare transmission line which is not used for data transmission and for controlling the transmission line through which said specific signal is not detected to operate as a currently used transmission line for data transmission, and status indication data sending means for sending out the status detected by said specific signal detection means to the transmission line determined as said spare transmission line by said discriminating means when said specific data is detected from the transmission line determined as said currently used transmission line by said discriminating means.

5. A loop transmission system according to claim 4 wherein said supervising station further includes fault detection means for detecting a fault in said currently used transmission line and means for stopping the sending of said specific signal by said specific signal sending means when said fault detection means detects a fault, and said terminal stations each include means for controlling said spare transmission line to operate as the currently used transmission line when said specific signal detecting means ceases to detect said specific signal from the transmission line determined as said spare transmission line by said discriminating means.

6. A loop transmission system according to claim 4 or 5 wherein said plurality of stations include a plurality of such terminal stations.

7. A loop transmission system according to claim 6 wherein said specific signal sending means generates a data signal of a repetitive pattern of "1" and "0".

8. A loop transmission system for effecting data communications among a plurality of stations, comprising:
   a plurality of stations including a supervising station and at least one terminal station;
   a pair of looped transmission lines, one of which is to operate as a current transmission line for carrying data communications between stations and the other of which is to operate as a spare transmission line not used for data communications; and
   respective switching means associated with each station and controlled thereby for connecting said plurality of stations in series in said current transmission line while connecting said spare transmission line to bypass said stations for data communications;

said supervising station including specific signal generator means for generating a spare line designating code signal and first control means for controlling said switching means associated with said supervising station to connect said supervising station in series in said looped transmission line which is to operate as said current transmission line and to connect said specific signal generator means to said looped transmission line which is to operate as said spare transmission line so that said spare line designating code signal is carried thereby;

said terminal station including specific signal detector means for detecting said spare line designating code signal on either one of said pair of looped transmission lines and second control means responsive to said specific signal detector means for controlling said switching means associated with that terminal station in series in the looped transmission line on which said spare line designating code signal is not detected.

9. A loop transmission system according to claim 8, wherein each of said stations includes a transmitter/receiver which is selectively connected in series with the current transmission line by said switching means under control of said first or second control means.

10. A loop transmission system according to claim 9, wherein said terminal station further includes first fault detector means connected to said current transmission line via said switching means for detecting a fault in a signal received on said current transmission line and for inhibiting operation of said transmitter/receiver in the terminal station upon detection of such fault.

11. A loop transmission system according to claim 9 or 10, wherein said supervising station further includes second fault detector means connected to said current transmission line via said switching means for detecting a fault in a signal received on said current transmission line, said second control means including means responsive to said second fault detector means detecting a fault for controlling said switching means to switch said specific signal generator means to the loop transmission line operating as said current transmission line so that said spare line designating code signal is then carried thereby and to switch the transmitter/receiver in the supervising station into series connection with the loop transmission line operating as said spare transmission line, whereby the current and spare operating status of said loop transmission lines is reversed in response to detection of said fault.

12. A loop transmission system according to claim 11, wherein said second control means in said terminal station includes means responsive to said specific signal detector means for detecting absence of spare line designating code signal on said spare transmission line for a first predetermined length of time and means for controlling said switching means to connect the transmitter/receiver in the terminal station into series connection with the loop transmission line operating as said spare transmission line.

13. A loop transmission system according to claim 12, wherein said terminal station further includes frame generator means responsive to said second control means detecting no spare line designating code signal on either loop transmission line for transmitting a message to said supervising station indicating failure to receive such signal.

14. A loop transmission system according to claim 8, wherein said plurality of stations includes a plurality of terminal stations.

* * * * *